United States Patent [19]

Zawodny

[11] 4,332,448

[45] Jun. 1, 1982

[54] FILM WINDING SAFETY MECHANISM

[75] Inventor: Arthur Zawodny, Budd Lake, N.J.

[73] Assignee: Keystone Camera Corporation, Clifton, N.J.

[21] Appl. No.: 207,672

[22] Filed: Nov. 17, 1980

[51] Int. Cl.³ .......................... G03B 1/00; G03B 17/26
[52] U.S. Cl. ...................................... 354/213; 354/275
[58] Field of Search .............................. 354/212–215, 354/217, 218, 275, 173

[56] References Cited

U.S. PATENT DOCUMENTS

| 2,241,122 | 5/1941 | Drotning | 354/213 X |
| 3,470,803 | 10/1969 | Fukuoka et al. | 354/173 |
| 3,486,431 | 12/1969 | Ettischer | 354/213 |
| 3,603,233 | 9/1971 | Kremp et al. | 354/213 |
| 3,685,414 | 8/1972 | Good | 354/213 X |

FOREIGN PATENT DOCUMENTS 1529990 5/1968 France .............................. 354/212

Primary Examiner—Donald A. Griffin
Attorney, Agent, or Firm—Neuman, Williams, Anderson & Olson

[57] ABSTRACT

A film winding safety mechanism is disclosed in which film metering and shutter-actuator mechanisms are driven from a sprocket wheel which is driven by film only when the film is properly loaded in a camera to be advanced by rotation of a take-up spool. The safety mechanism is disabled when no cartridge is installed in a manner such as to permit test operation of the camera shutter.

8 Claims, 5 Drawing Figures

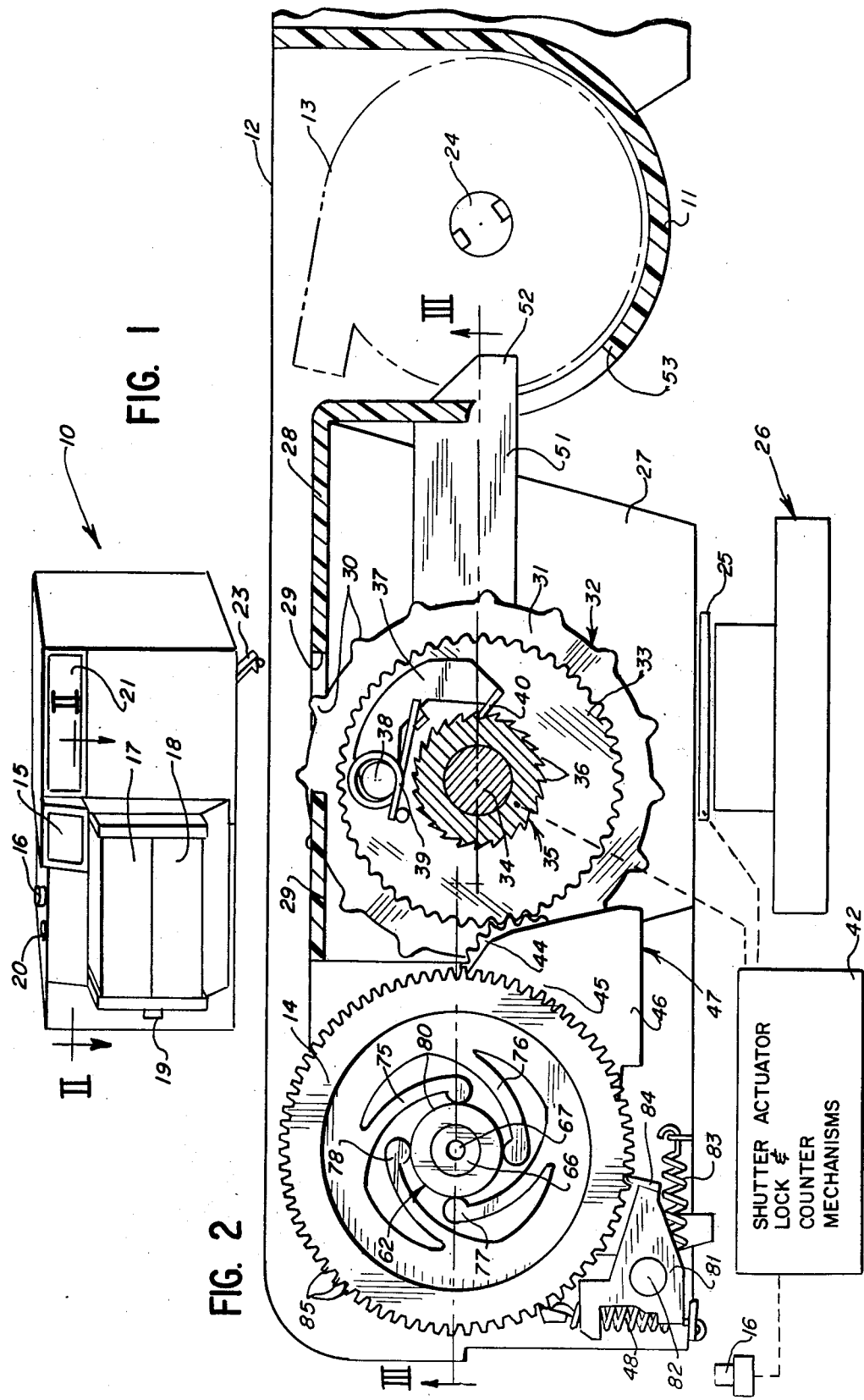

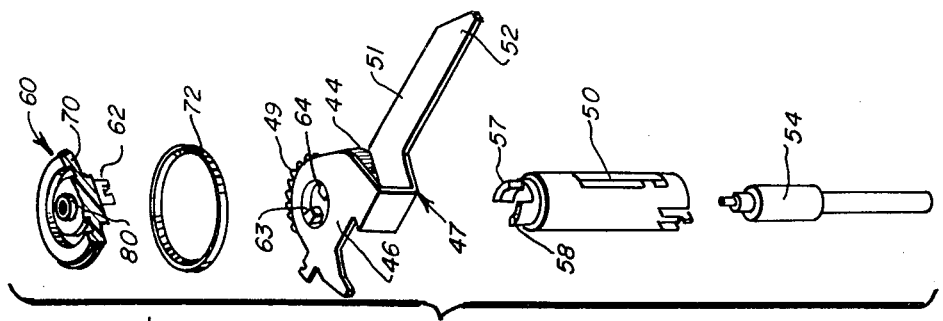
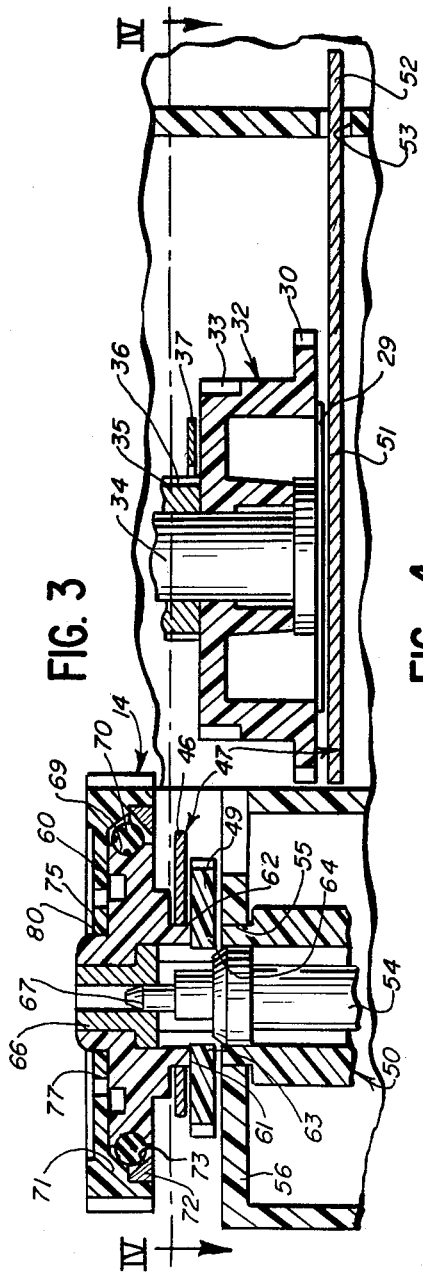
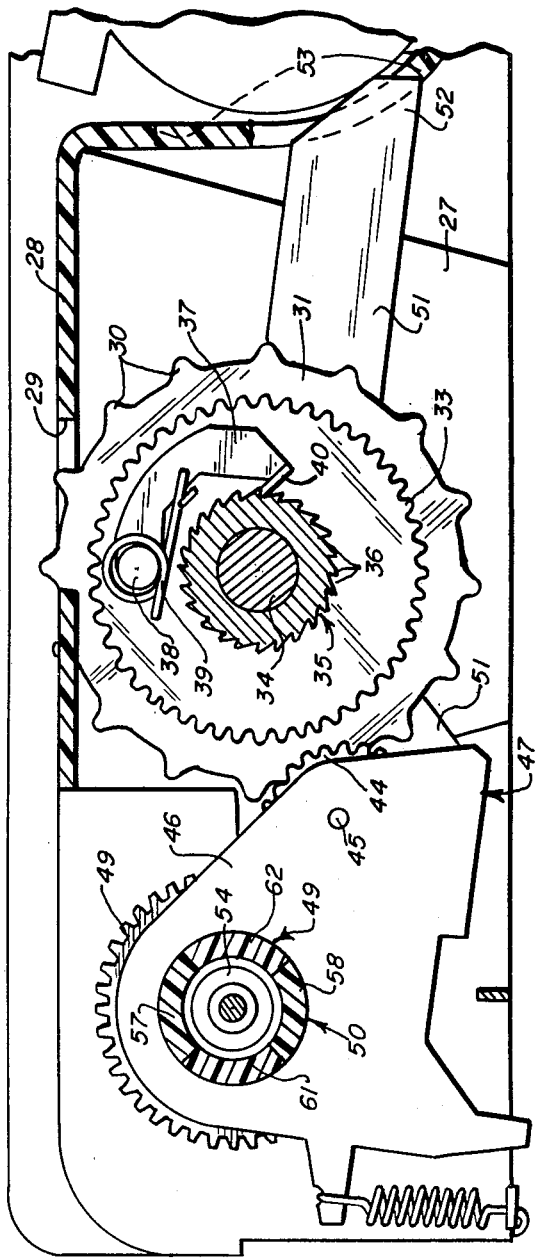

FILM WINDING SAFETY MECHANISM

This invention relates to a film advance safety mechanism and more particularly to a mechanism which permits operation of a camera only when film is properly loaded into a camera. The mechanism of the invention is reliable and trouble-free in operation and is relatively simple in construction, requires a minimum number of component parts and is otherwise readily and economically manufacturable. The mechanism does not interfere with test operations of a camera with no cartridge installed in the camera.

BACKGROUND OF THE INVENTION

In operating conventional cameras of the prior art, the user is unable to determine whether he has properly loaded the film in the camera and, if he has not, he may find to his chagrin that after supposedly taking a full roll of pictures, he has taken no pictures at all. In some cases, he may discover the improper loading of the camera when attempting to rewind the film or when unloading the camera. In other cases, he may not be aware of any problem at all until after the film has been developed and he may not then be able to ascertain the cause of the trouble and may make incorrect assumptions with respect to the quality of the film or the operability of the camera mechanism.

Various arrangements have heretofore been proposed for avoiding this problem but such arrangements have not been used to any great extent, if at all, due to problems with reliability, complexity and cost of manufacture. In certain proposed arrangements, indicators have been operated by movement of film on a take-up spool or between supply and take-up spools but such arrangements are not entirely reliable because they require attention on the part of the user of the camera. Other proposed arrangements require electrically operated shutters and switch arrangements, and/or other complex mechanisms for preventing operation of the shutter when film is not advanced. Such arrangements are not only complex but they are expensive and can be unreliable as well.

Proposals have also been made for providing mechanisms which prevent rotation of a take-up spool or otherwise prevent film movement when no cartridge is in place in the camera. Such proposals do not recognize and do not solve the problem presented when the user fails to properly thread the film and attach the film to the take-up spool. They do not recognize that if, for any reason, the film is not connected to the take-up spool, the camera will not move the film through the image area at the back of the exposure chamber. Thus, the user can operate the camera without being aware that the film is not being advanced and that no pictures are being taken.

SUMMARY OF THE INVENTION

This invention was evolved with the general object of overcoming disadvantages of prior art cameras and of providing a highly effective safety arrangement for insuring against operation of the camera on an incorrect assumption that pictures are being taken.

Another object of the invention is to provide such a safety arrangement which is highly reliable and trouble-free in operation.

A further object of the invention is to provide a safety arrangement which is relatively simple in construction and readily and economically manufacturable.

In a camera constructed in accordance with this invention, safety means are provided which include means for engagement by film in the camera and which allows operation of a shutter of the camera only after a prior advancing movement of film into the image area to which an image is projected by a lens of the camera. In accordance with a specific feature, the safety means is mechanically connected to the shutter to control operation thereof, being preferably arranged to control mechanical cocking of the shutter.

In accordance with another specific feature, the film engaging means of the safety means functions as part of film metering means operable to control the distance of movement of the film during each operation of the film advancing means. Preferably, the film engaging means is formed by a sprocket wheel which operates in a conventional fashion to be rotated through a predetermined angle during each operation of the film advancing means.

Another specific feature relates to the provision of cartridge detecting means for detecting the presence of a film cartridge in the camera, combined with disabling means operative to disable the safety means when a cartridge is not present. With this feature, the shutter of the camera may be tested in a conventional fashion when no cartridge is present and the provision of the safety mechanism does not interfere with this advantageous operation.

Further important features of the invention relate to the construction of the safety means and also to the construction of the disabling means in a manner such as to obtain highly reliable and trouble-free operation, while at the same time permitting economical construction of the camera. Preferably, a sprocket wheel engaged and rotated by the film is coupled to shutter cocking means as well as to lock means operative to lock the sprocket wheel against further rotation after it is rotated through a predetermined angle, the lock means being released upon actuation of the shutter of the camera in a conventional fashion. Thus, standard components of proven reliability are used and the number of additional components required is minimized. For disabling the safety mechanism, a rotatable drive connection is provided between the take-up means of the camera and the sprocket wheel, the drive connection including a clutch which is engaged by the disabling means in the absence of a cartridge in the cartridge chamber. The clutch may preferably be in the form of an idler gear engageable between a gear driven by the take-up means and a gear coupled to the sprocket wheel. The idler gear is most preferably carried by a lever having an end portion extending into the film cartridge chamber. Thus, a comparatively simple arrangement is provided which can be readily and economically manufactured.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view of a camera which includes a film winding safety mechanism in accordance with the invention;

FIG. 2 is a top plan view of portions of the film winding safety mechanism with components connected thereto being shown diagrammatically, the level of view of FIG. 2 being indicated by line II—II in FIG. 1;

FIG. 3 is a sectional view taken substantially along line III—III of FIG. 2;

FIG. 4 is a sectional view which is similar to FIG. 2 but at a lower elevation indicated by line IV—IV of FIG. 3 also differing from FIG. 2 in illustrating the condition of components when a film cartridge is installed in the camera in contrast to a condition without a cartridge installed in the camera as shown in FIG. 2; and FIG. 5 is an exploded perspective view illustrating the manner in which certain components of the mechanism are formed and assembled.

DESCRIPTION OF A PREFERRED EMBODIMENT

Reference numeral 10 generally designates a camera which includes a film winding safety mechanism constructed in accordance with the principles of this invention. The camera 10 as illustrated is of a type designed for use with a standard 35 MM cartridge, it being understood that the safety mechanism of the invention may be used with cameras of other types.

In the operation of the camera 10, a hinged back (not shown) is opened and a film cartridge is inserted into a chamber which is defined by a wall portion 11 of a housing structure 12 (FIG. 2), a cartridge being shown in broken lines and being indicated by reference numeral 13. The end of the film is then drawn from the cartridge and is engaged with a take-up spool which is connected to and positioned on the axis of a thumbwheel 14. After closing the back, a rearward peripheral portion of the thumbwheel 14 may be engaged by the thumb of the user to advance the film and to cock a shutter of the camera, as hereinafter described. Pictures are taken by viewing through a viewfinder 15 and depressing a shutter release button 16.

As illustrated, although not part of the invention, a pair of hinged front doors 17 and 18 are provided which are held in a closed position by latch 19 and which are spring-loaded to be swung forwardly to open positions either upon manual actuation of latch 19 or in the initial portion of downward movement of the shutter release button 16. Also, a counter is provided for counting the number of pictures taken after loading of a cartridge in the camera, the number being shown on a dial visible through a window 20. In addition, a built-in flash is provided which includes a strobe lamp and a reflector behind a front window 21.

After taking a complete roll of pictures, the user may rewind the film into the cartridge 13 by pulling out a pivoted rewind handle 23 to a downwardly projecting position as illustrated at FIG. 1, the handle 23 being then rotated about a vertical axis to rewind the film. Handle 23 is coupled through conventional means, not shown, to a rewind shaft 24 at the lower end of the cartridge chamber (FIG. 2), shaft 24 being drivingly engaged with a lower end of a spool in the cartridge 13.

As diagrammatically illustrated in FIG. 2, a shutter 25 is disposed between a lens unit 26 and the forward end of a portion 27 of the housing 12 which defines an exposure chamber. The film extends from the cartridge 13 through an image area at the rear of the exposure chamber 27, an upper edge portion of the film being engaged with the rearward face of a wall portion 28 which has an opening 29 through which sprocket teeth 30 extend to engage in sprocket holes of the film.

In the illustrated mechanism, the sprocket teeth 30 are formed on a lower sprocket portion 31 of a metering wheel 32 which includes an upper gear portion 33 and which is journalled on a shaft 34, shaft 34 being supported at its upper end from a fixed plate of the camera, not shown. A metering cam element 35 is also supported on the shaft 34 above the metering wheel 32 and it includes cam or actuating structure on an upper portion thereof, not shown, and also includes a lower portion, as shown, having ratchet teeth 36 arranged to be engaged to be rotated in one direction from the metering wheel 32, through an interlock lever 37. Lever 37 is journalled on an upwardly projecting stud portion 38 of the wheel 32 and is urged by a spring 39 in a clockwise direction to engage a pawl 40 at one end thereof with the ratchet teeth 36. With this arrangement, the metering cam element 35 is driven in a counter-clockwise direction, as viewed from above, when the metering wheel 32 is driven in the same direction.

As diagrammatically illustrated in FIG. 2, the shutter 25, the metering cam element 35 and also the shutter release button 16 are connected to shutter actuator, lock and counter mechanisms 42 which are of conventional construction, the details thereof being not illustrated. Upon counter-clockwise rotation of the element 35 through a certain angular distance corresponding to one frame of the film (an angular distance of 180° in the illustrated embodiment), the shutter actuator is cocked and a lock is actuated to prevent further rotation of the element 35 in a counter-clockwise direction. Also, a counter dial is rotated through a certain angular distance to permit viewing of a next-higher number through the window 20. When the release button 16 is depressed, the shutter 25 is operated and the lock mechanism is released to again permit rotation of the cam element 35 in a counter-clockwise direction and recocking of the shutter actuator operation of the lock and advancing movement of the counter dial.

With the safety mechanism of this invention, the metering wheel 32 is driven from rotation of the thumbwheel 14 in either of two ways, depending upon conditions of operation. When a film cartridge is installed in the camera and the film is properly threaded and connected to a take-up spool, the film is driven by rotation of the take-up spool and the wheel 32 is driven by the film, through engagement of the sprocket teeth 30 in sprocket holes of the film. When no cartridge is installed in the camera, under conditions as depicted in FIG. 2, the metering wheel 32 is driven from an idler gear 44 which has peripheral teeth meshed with the peripheral teeth of the gear portion 33 of the metering wheel 32, the idler gear 44 being driven from rotation of the thumbwheel 14. The arrangement is such that when a cartridge is installed, the film must be properly threaded and connected to the take-up spool in order to permit operation of the shutter 25. However, when no cartridge is installed, the shutter actuating mechanism may be cocked and the shutter may be operated for test purposes.

The idler gear 44 is journalled on a stud element 45 which has a reduced diameter end portion affixed in an opening in an upper portion 46 of a sensor arm 47 which is urged by a spring 48 to the position as illustrated in FIG. 2. The upper portion 46 of the sensor arm 47 is journalled for pivotal movement about the axis of the thumbwheel 14 and the pick-up spool and the idler gear 44 continuously meshes with a thumbwheel gear 49 (FIGS. 3 and 4) connected to the take-up spool, indicated by reference numeral 50 in FIG. 3. The sensor arm 47 has a lower portion 51 which extends under the metering wheel 32, the portion 51 having a terminal end 52 extending through a slot 53 in the wall 11 and having a beveled edge engageable by the film cartridge 13 when installed in the chamber defined by the wall 11. As shown in FIG. 4, when the cartridge 13 is installed in the cartridge chamber, it engages the end portion 52 and the sensor arm 47 is rotated in a clockwise direction, as viewed from above, to move the idler gear 44 to a position in which the teeth thereof no longer mesh with the teeth of the gear portion 33 of the metering wheel 32. In this condition, the metering wheel 32 can be rotated only when sprocket teeth 30 are engaged in the sprocket holes of the film and the film is moved by counter-clockwise rotation of the take-up spool.

The take-up spool 50 is mounted on a take-up spool shaft 54 and the upper end of the spool 50 is journalled in an opening 55 in a wall portion 56 of the housing structure 12. The upper end of the spool 50 is formed with two upwardly projecting and diametrically opposed portions 57 and 58 which extend through the thumbwheel gear 49 and through an opening 59 in the upper portion 46 of the sensor arm 47 and into a socket in the lower side of a film-advance pulley 60. Pulley 60 is formed with two downwardly projecting and diametrically opposed portions 61 and 62 which engage between portions 57 and 58 of spool 50 and which are grooved at their lower ends to receive radially inwardly extending projections 63 and 64 of the thumbwheel gear 49. Thus, the thumbwheel gear 49, take-up spool 50 and film-advance pulley 60 are drivingly coupled together. Pulley 60 is journalled on a bearing 66 which is seated on a reduced-diameter end portion 67 of the take-up spool shaft 54.

The thumbwheel 14 could be directly coupled to the take-up spool, if desired, and such would not affect the operation of the safety mechanism as described. However, an arrangement is illustrated in which the pulley 60 is releasably coupled to the thumbwheel 14. The arrangement permits a free rewind operation with no release mechanism being required to effect a rewind operation.

In particular, the pulley 60 has an annular peripheral groove 69 which receives an O-ring 70 of resilient elastomeric material. The thumbwheel 14 has an inwardly facing beveled surface 71 and a ring 72 is secured in a groove in the lower face of the thumbwheel 14, the ring 72 having an inwardly facing beveled surface 73. The surfaces 71 and 73 form an inwardly facing generally V-shaped groove on the outside of the O-ring 70.

The thumbwheel 14 is also formed with four fingers 75, 76, 77 and 78 which extend angularly and radially inwardly to terminal ends which are engageable with an external cylindrical surface portion 80 at the upper end of the pulley 60. Normally, the fingers 75-78 hold the thumbwheel 14 in a centered position such that the surfaces 71 and 73 do not engage the O-ring 70. However, when a slight radial pressure is applied at the periphery of the thumbwheel 14, the surfaces 71 and 73 frictionally engage the O-ring 70 and when the thumbwheel 14 is rotated, the pulley 60 is then rotated therewith.

To prevent rotation of the thumbwheel 14 in a clockwise direction, an interlock lever 81 is provided which is journalled on a stud 82 and which is biased by a spring 83 in a clockwise direction to engage a pawl portion 84 thereof with peripheral teeth 85 of the thumbwheel 14.

With this arrangement, the thumbwheel 14 may be rotated in a counter-clockwise direction to rotate the gear 49 and the take-up spool 50, acting through the pulley 60. If a cartridge is not installed in the camera, the metering wheel 32 is rotated in a counter-clockwise direction through engagement of the idler gear 44 with the metering wheel gear portion 33. If a cartridge 13 is installed in the camera and if the film is properly threaded and connected to the take-up spool 50, the sprocket portion 31 of the metering wheel 32 is driven from the film.

After a complete roll of pictures has been taken, the rewind handle 22 is moved to a downwardly projecting position as illustrated in FIG. 1 and it is rotated to rotate the rewind shaft 23 and to thereby rotate the spool of the cartridge 13 to rewind the film. In this operation, the pulley 60 together with the gear 49 and the take-up spool 50, may rotate freely, there being no engagement between the O-ring 70 and the surfaces 71 and 72 since the thumbwheel 14 is held by the fingers 75-78 in a centered position. The metering wheel 32 may rotate in a clockwise direction during the rewind operation, with the pawl portion 40 of the lever 37 riding freely over the teeth 36 of the cam element 35. Thus the cam element 35 is not rotated in a clockwise direction.

It will be understood that modifications and variations may be effected without departing from the spirit and scope of the novel concepts of this invention.

I claim:

1. In a camera including lens means for projecting an image to an image area, shutter means for controlling projection of said image to said image area, film supply means comprising means defining a chamber for receiving a film cartridge, film take-up means, and film advancing means coupled to said take-up means and operable for advancing film through said image area from said supply means to said take-up means, a sprocket wheel engageable with the film and rotatable by the film and through a predetermined angle during each operation of said film advancing means, and safety means allowing operation of said shutter means only in response to rotation of said sprocket wheel through said predetermined angle, cartridge detection means for detecting the presence of a film cartridge in said chamber, and disabling means coupled to said detecting means and to said safety means for disabling said safety means in the absence of a cartridge in said chamber.

2. In a camera as defined in claim 1 wherein said take-up means includes a shaft rotated during operation thereof, a rotatable drive connection between said shaft and said sprocket wheel including a clutch, said disabling means including means for engaging said clutch in the absence of a cartridge in said chamber.

3. In a camera as defined in claim 2, said rotatable drive connection including a first gear on said shaft, a second gear coupled to said sprocket wheel and a third idler gear selectively engaged between said first and second gears to form said clutch.

4. In a camera as defined in claim 3, said detector means comprising a lever carrying said idler gear and having an end portion extending into said chamber for operation by a film cartridge inserted into said chamber.

5. In a camera including lens means for projecting an image to an image area, shutter means for controlling projection of said image to said image area, film supply means comprising means defining a chamber for receiving a film cartridge, film take-up means, and film advancing means coupled to said take-up means and operable for advancing film through said image area from said supply means to said take-up means, safety means for allowing operation of said shutter means only after a prior advancing movement of the film, said safety means including means engageable by the film and being mechanically connected to said shutter means to control operation thereof, cartridge detection means for detecting the presence of a film cartridge in said chamber, and disabling means coupled to said detection means and to said safety means for disabling said safety means in the absence of a cartridge in said chamber.

6. In a camera as defined in claim 5, said safety means being arranged to control mechanical cocking of said shutter.

7. In a camera including lens means for projecting an image to an image area, shutter means for controlling projection of said image to said image area, film supply means, comprising means defining a chamber for receiving a film cartridge, film take-up means, and film advancing means coupled to said take-up means and operable for advancing film through said image area from said supply means to said take-up means, film metering means engageable and actuatable by the film to control the distance of movement of the film during each operation of said film advancing means, and safety means coupled to said film metering means and to said shutter means for allowing operation of said shutter means only after actuation of said film metering means by said film, cartridge detection means for detecting the presence of a film cartridge in said chamber, and disabling means coupled to said detection means and to said safety means for disabling said safety means in the absence of a cartridge in said chamber.

8. In a camera including lens means for projecting an image to an image area, shutter means for controlling projection of said image to said image area, film supply means, film take-up means, and film advancing means coupled to said take-up means and operable for advancing film through said image area from said supply means to said take-up means, a sprocket wheel engageable with the film and rotatable by the film during operation of said film advancing means, a one-way clutch, a rotatable metering element coupled to said sprocket wheel through said one-way clutch and operative to allow rotation of said sprocket wheel through only a predetermined angle in response to operation of said film advancing means, said one-way clutch being operable to a disengaged condition to allow rotation of said sprocket wheel in a reverse direction during film rewind, and safety means coupled to said metering element and to said shutter means for allowing operation of said shutter means only after actuation of said film metering means by said film through said sprocket wheel and said one-way clutch.

* * * * *